(No Model.)
J. R. PALMER.
CHURN DASHER.
No. 342,839. Patented June 1, 1886.
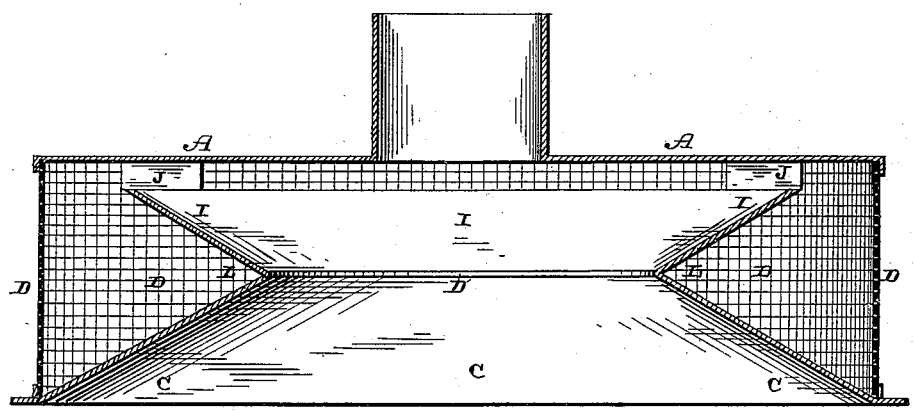
Witnesses
L. L. Gardner
A. W. Brecht
Inventor
Jos. R. Palmer,
per J. A. Lehmann,
Atty.
N. PETERS, Photo-Lithographer, Washington, D. C.

UNITED STATES PATENT OFFICE.

JOSEPH RODGERS PALMER, OF WIDE AWAKE, KENTUCKY.

CHURN-DASHER.

SPECIFICATION forming part of Letters Patent No. 342,839, dated June 1, 1886.

Application filed March 29, 1886. Serial No. 197,031. (No model.)

*To all whom it may concern:*

Be it known that I, JOSEPH RODGERS PALMER, of Wide Awake, in the county of Carroll and State of Kentucky, have invented certain new and useful Improvements in Churn-Dashers; and I do hereby declare the following to be a full, clear, and exact description of the invention, such as will enable others skilled in the art to which it pertains to make and use it, reference being had to the accompanying drawing, which form part of this specification.

My invention relates to an improvement in churn-dashers; and it consists in a churn-dasher consisting of the solid top, the concave bottom, the flange attached to the bottom and top, and the vertical wire screen secured to the top and bottom, as will be more fully described hereinafter.

The object of my invention is to provide a churn-dasher in which the cream is forced outward through a wire screen with sufficient force to break the butter globules, and to mingle with the cream as it is being forced through the screen a sufficient quantity of air to help break the globules.

The accompanying drawing represents a vertical section of a dasher embodying my invention.

A represents a solid top of a dasher, which is preferably made circular in shape. The outer edge of this dasher is turned downward, as shown, and inside of this turned-down edge is secured the vertical wire screen D, through which the cream is forced for the purpose of breaking the butter globules. To the lower edge of this vertical screen D is secured the concaved bottom C, which has a large opening, D', through its center. To the upper edge of this bottom C is secured an upwardly-flaring flange, I, of any suitable width. This flange approaches within any desired distance of the under side of the top A; but there must be left sufficient space for the passage of the cream, which is forced upward through the opening in the concaved bottom when the dasher descends. This flange is braced rigidly in position by means of the stays J, which are secured to its upper edge and to the under side of the top. As will be seen, there is a V-shaped space, L, between the top of the concaved bottom and the flaring flange for the purpose of holding a suitable quantity of air, which, as the cream rises up over the top of the flange and falls down upon the top of the bottom, mingles with the cream as it is being forced through the wire screen for the purpose of assisting in breaking up the cream globules. As the cream drops over the top of the flange the air which is held in this V-shaped recess becomes displaced by the cream and is forced outward through the wire screen with the cream. The very act of forcing the cream upward through the bottom of the dasher and then having it drop down over the flange will break up the cream globules to a very great extent; but by having them pass through the wire screen breaks them up to a much greater extent.

Having thus described my invention, I claim—

A churn-dasher consisting of the solid top, the concave bottom, the flange attached to the bottom and top, and the vertical wire screen secured to the top and bottom, substantially as described.

In testimony whereof I affix my signature in presence of two witnesses.

JOSEPH RODGERS PALMER.

Witnesses:
W. B. WINSLOW,
J. F. BROWINSKI.